United States Patent Office 3,399,150
Patented Aug. 27, 1968

3,399,150
PROCESS FOR POLYMERIZING OLEFIN OXIDES AND CATALYST COMPOSITIONS COMPRISING AN ORGANO-METALLIC COMPOUND WITH A METAL CARBONATE OR SULFATE THEREFOR
Mituji Miyoshi and Shozo Tsuchiya, Kawasaki-shi, Tatsuo Kinoshita, Tokyo, and Takeo Koizumi, Kawasaki-shi, Japan, assignors to Nippon Oil Company, Limited, Tokyo, Japan
No Drawing. Filed Oct. 7, 1965, Ser. No. 493,928
Claims priority, application Japan, Oct. 15, 1964, 39/58,325
10 Claims. (Cl. 260—2)

ABSTRACT OF THE DISCLOSURE

A process for preparing propylene oxide homopolymer or copolymer which comprises polymerizing propylene oxide or copolymerizing propylene oxide with a 1,2-epoxide in the presence of a catalyst composition consisting of an organo metallic compound in which the metal is selected from Groups II and III of the Periodic Table and a carbonate or sulfate of zinc, magnesium, calcium, strontium or barium.

---

The present invention relates to a process for preparing a high molecular weight polymer of olefin oxides, and more particularly to a process for preparing said polymers of olefin oxides by polymerizing same in the presence of a novel catalyst composition. Namely, the present invention relates to a process for producing homopolymer or copolymer of olefin oxides of high molecular weight by polymerizing said olefin oxides in the presence of a catalyst composition consisting of a metal carbonate or sulfate and an organometallic compound.

Heretofore, as catalysts for producing polymers of olefin oxides, the independent use of compounds such as oxides, sulfates, alkoxides, carbonates, chelates and halides of metals and iron compounds, further, the use of mixed catalyst compositions such as metal fluoride (or oxide)-organozinc compound, organozinc or aluminum compound-absolute alcohol-aluminum oxide, organozinc compound-titanium alkoxide, organoaluminum compound-aluminum hydroxide, and silica (or alumina)-organoaluminum or organozinc compound have been proposed.

In the case of using metal carbonate or metal sulfates known in the processes of prior art independently as a catalyst, the polymerization or copolymerization of olefin oxides is preferably performed at higher temperatures such as from 100° C. to 150° C.

The above-mentioned processes of the prior art have disadvantages in that the fabrication of reaction equipment to be used at such higher temperatures as described above is rather expensive and that the independent use of metal carbonate or sulfates as a catalyst requires an unnecessarily long induction period before the initiation of polymerization of olefin oxides.

We have now found that an olefin oxide is polymerized in the presence of catalyst compositions consisting of certain metal carbonates or sulfates and an organometallic compound, a high polymer thereof is obtainable in high yield without requiring any induction period.

It is quite surprising that, unlike when using metal carbonates, metal sulfates or organometallic compounds independently as a catalyst, the new catalyst composition prepared by combining said metal carbonates or sulfates with the organometallic compounds, enables the production of high polymer of olefin oxides in high yield without requiring any induction period.

Accordingly, an object of the present invention is to provide a process for polymerizing olefin oxides in the presence of a novel active catalyst composition.

Another object is to provide a process for polymerizing olefin oxides in the presence of a novel catalyst composition thereby producing a high polymer thereof in high yield without requiring any induction period.

Still another object of the present invention is to provide a novel catalyst composition suitable for polymerizing olefin oxides thereby producing high polymers thereof in a short period of time at lower temperatures in high yield.

These and other objects of the present invention and the attendant advantages may be understood from the following description and appended claims.

The polymerization process according to the present invention comprises polymerizing or copolymerizing olefin oxides in the presence of a catalyst composition consisting of at least one organometallic compound containing a metal of Groups II–A, II–B, III–A and III–B of the Periodic Table, and at least one carbonate or sulfate of a metal of Groups II–A, II–B, III–A and III–B of the Periodic Table, to form a homopolymer or copolymer of olefin oxides having a high molecular weight.

The organometallic compounds containing a metal of Groups II–A, II–B, III–A and III–B of the Periodic Table which may be used in the catalyst of the present invention are those represented by the formula

wherein Me represents a metal of said groups of the Periodic Table, R is a hydrocarbon residue and $n$ is the valency of the metal Me. For example, diethyl zinc, diphenyl zinc, triethyl aluminum, etc., are included.

The carbonates or sulfates of a metal of Groups II–A, II–B, III–A and III–B of the Periodic Table which may be used in the catalyst composition of the present invention include, for example, zinc carbonate, calcium carbonate, strontium carbonate, calcium sulfate, zinc sulfate, magnesium sulfate, aluminum sulfate, etc.

The olefin oxides polymerizable according to the process of the present invention may be represented by the formula

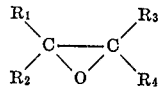

wherein $R_1$, $R_2$, $R_3$ and $R_4$ represent hydrogen, alkyl, vinyl, aryl, chloromethyl, bromomethyl, fluoromethyl, trifluoromethyl, halogen, allyloxymethyl or phenoxymethyl groups, and wherein $R_2$ and $R_3$ may form a ring.

Among the olefin oxides which may be represented by the formula, ethylene oxide, propylene oxide, isobutylene oxide, butadiene monoxide, epichlorohydrin, styrene oxide, allylglycidyl ether, and cyclohexene oxide of which formula has a ring formed with $R_2$ and $R_3$, and the derivatives thereof etc., may be used. These olefin oxides may be used either independently or as a mixture of more than one thereof in the present invention.

The proportion of the components of the catalyst composition used in the polymerization process of the present invention, the ratio of organometallic compounds to the metal carbonates or sulfates, is not critical, and as a matter of fact, any molar ratio between the values of 1000/1 to 1/1000 may be used, however, ratio in the vicinity of 1/10 are preferable.

The amount of catalyst composition used in the process of polymerization according to the present invention is also not critical, however, about 0.01 mol percent of organometallic compounds based on olefin oxides is most preferable.

In the polymerization of the present invention, the mere presence of both of the organometallic compound and the metal carbonate or sulfate in the polymerization system leads to a satisfactory result and no particular way of charging these components is required. In other words, no substantial difference in polymerization activity is recognized either by adding the respective component separately, or by adding a catalyst composition prepared by mixing said two components to the reactant mixture.

In practising the polymerization process of the present invention, conventional conditions for the polymerization of olefin oxides heretofore known are readily applicable. Namely, the polymerization process of the present invention may be carried out in diluents which are inert to monomeric olefin oxides, for instance, diethyl ether, benzene, petroleum ether, petroleum benzine, hexane, heptane, etc.

Polymerization temperatures of from 0° C. to 200° C. may be used, however, commercially, temperatures between room temperature and 130° C. are preferable.

The result of the polymerization of propylene oxide in a sealed tube at a temperature of 60° C. for 70 hours using diethyl zinc, which is one of the components constituting the catalyst composition of the present invention, independently as a catalyst, revealed that such catalyst is only capable of producing polymer of a low molecular weight in a low yield of only 1.4%. Further, practically no polymer is obtained by polymerizing propylene oxide using another, or second component of the catalyst composition of the present invention, for instance, anhydrous calcium sulfate or zinc carbonate, independently as a catalyst, under the same conditions as described in the above.

On the other hand, however, when olefin oxide is polymerized in the presence of the catalyst composition of the present invention, high polymer thereof may be obtained in high yield, e.g., as high as 90%.

The polymers obtained according to the polymerization process of the present invention have intrinsic viscosities of from 6 to 11, which correspond to molecular weights of from 600,000 to 1,000,000. Considering the fact that the intrinsic viscosity of polymers obtained by the processes of prior art usually is 4.0 at the maximum, it is readily recognizable that the catalyst composition of the present invention is remarkably effective for the increase of molecular weight of the resultant polymers.

As noted above, inasmuch as polymerization of olefin oxides according to the present invention can be accomplished at lower temperatures than those of processes known heretofore, there are attendant advantages in that the reaction equipment required for the process is inexpensive; that the present process produces less byproducts; and that the operation is much simplified. Even more surprising is the fact that in spite of the polymerization proceeding at lower temperatures, the present process requires a shorter reaction period.

The high polymers of olefin oxides obtained by the process of the present invention are useful as thermoplastic resins and elastomers. Particularly, the elastomer obtained by vulcanizing said polymers is characterized in that it has excellent low temperature characteristics and less elasticity change due to temperature. Accordingly, the elastomer of this type may be suitably used for purposes involving low temperatures and temperature changes.

Summarizing, as can be noted from the foregoing description, the process for producing a high polymer of olefin oxide of the present invention is superior to the processes of prior art in that it requires no induction period; that the yield is extremely high; and that an extremely high degree of polymerization is obtained for the resultant polymer.

It is a matter of great significance that the production of high polymers of olefin oxides has been made possible, easily and commercially, by the process of the present invention.

The present invention will be better understood from the following examples. However, it should not be construed that these examples restrict the present invention in any event, inasmuch as many apparently and widely different embodiments of the present invention may be made without departing from the spirit and scope thereof.

Example 1

0.25 g. of a white powder of zinc carbonate which is dried for 24 hours under a nitrogen stream at 105° C. is put into a test tube of 50 ml. capacity which is sufficiently flushed with nitrogen. Then, 0.25 g. of diethyl zinc is added thereto at room temperature. After being left under quiescent conditions for an hour, 7 ml. of benzene and 0.1 mol of propylene oxide are charged thereto. The above operations are carried out under a nitrogen stream. Said test tube is then sealed and left under quiescent conditions at a temperature of 60° C. for 70 hours, and the polymerization reaction is stopped by adding a small amount of methanol. After that, the resultant polymer is dissolved in benzene and the catalyst is removed by centrifugation followed by freeze-drying, whereby a purified polymer is obtained.

The above experiment is designated as Experiment No. 1, and the same experiments except for using diethyl zinc and zinc carbonate separately as a catalyst are repeated. These experiments are designated as Experiment No. 2 and No. 3, respectively. The results of these experiments are given in Table I with respect to the degree of polymerization, intrinsic viscosity in benzene solution at 30° C. and appearances:

TABLE I

| Exp. No. | Organiozinc compound | Metal carbonate | Yield, percent | Intrinsic viscosity | Appearance |
|---|---|---|---|---|---|
| 1 | $Zn(C_2H_5)_2$ | $ZnCO_3$ | 48.7 | 5.80 + | Rubber-like solid. |
| 2 | $Zn(C_2H_5)_2$ | | 1.4 | | Viscous liquid. |
| 3 | | $ZnCO_3$ | 4.2 | 0.15 | Do. |

Example 2

Polymerization of propylene oxide is carried out under the same conditions as described in Example 1 except that a white powder of anhydrous calcium sulfate is used as the metal sulfate component. This experiment is designated as Experiment No. 1. For comparison purposes, the same experiment is repeated using calcium sulfate independently as a catalyst, which is designated as Experiment No. 2. The results of these experiments are given in Table II.

TABLE II

| Exp. No. | Organozinc compound | Metal sulfate | Yield, percent | Intrinsic viscosity | Appearance |
|---|---|---|---|---|---|
| 1 | $Zn(C_2H_5)_2$ | $CaSO_4$ | 87.3 + | 6.2 | Rubber-like solid. |
| 2 | | $CaSO_4$ | | | |

Example 3

Polymerization of propylene oxide is carried out under the same conditions as described in Example 1, except that the amount of diethyl zinc is reduced to 0.01 g., instead of 0.25 g. in said example. A white rubber-like polypropylene oxide having an intrinsic viscosity of 7.0 is obtained in a yield of 88.3%.

Example 4

Polymerization of propylene oxide is performed under the same conditions as described in Example 1, except that the reaction temperature is changed from 60° C. to 30° C. A white rubber-like polypropylene oxide having an intrinsic viscosity of 1.4 in benzene solution at 30° C. is obtained in a yield of 10.7%.

Example 5

0.25 g. of diethyl zinc and 0.25 g. of zinc carbonate are put into a test tube of 50 ml. capacity in accordance with the operations described in Example 1. Said test tube is left standing for an hour, then, 90 parts by weight of propylene oxide and 10 parts by weight of allylglycidyl ether are added thereto and the tube is sealed. After being left under quiescent conditions at 80° C. for 36 hours, the polymerization reaction is stopped by adding a small amount of methanol. Then, the resultant polymer is dissolved in benzene containing 0.4 part by weight of phenyl-β-naphthylamine, and after removing the catalyst and drying, 60 parts by weight of purified polymer are obtained. The intrinsic viscosity of the resultant polymer is 6.4 in benzene solution at 30° C. Said propylene oxide-allylglycidylether copolymer is a rubber-like polymer containing 4.0% or 4.6% of allylglycidylether measured by infrared spectrum or bromination method, respectively.

Example 6

95 parts by weight of propylene oxide and 5 parts by weight of allylglycidylether are placed in a test tube in accordance with the procedures described in Example 5. After the test tube is sealed and left under quiescent conditions for 36 hours at 80° C., the polymerization reaction is stopped by adding a small amount of methanol, the resulting polymer is dissolved in benzene containing 0.4 part by weight of phenyl-β-naphthylamine, then, the catalyst is removed therefrom and the product dried thereby obtaining 87 parts by weight of polymer having an intrinsic viscosity of 6.3 in benzene solution at 30° C. The resulting rubber-like copolymer is proved to contain 2.4% of allylglycidylether measured by the bromination method.

Example 7

95 parts by weight of propylene oxide and 5 parts by weight of vinyl cyclohexane monoxide are placed in a test tube according to procedures similar to Example 6, and after the same treatment as described therein, 16 parts by weight of a polymer having intrinsic viscosity of 2.6 in benzene solution at 30° C. is obtained. The resultant rubber-like copolymer is found to contain 18% of double bond according to the bromination method.

What we claim is:

1. A process for preparing propylene oxide homopolymer which comprises polymerizing propylene oxide at a temperature of 0–200° C. in the presence of a catalyst composition consisting of an organometallic compound represented by the formula $MeR_n$ wherein Me is zinc or aluminum, R represents a hydrocarbon residue and $n$ is 2 when Me is zinc and 3 when Me is aluminum and a member selected from the group consisting of carbonates and sulfates of zinc, magnesium, calcium, strontium and barium, said $MeR_n$ and said carbonates or sulfates being present in a molar ratio of 0.01:2.0.

2. A process as claimed in claim 1, wherein the temperature is between room temperature and 130° C.

3. A process as claimed in claim 1, wherein R is ethyl or phenyl.

4. A process as claimed in claim 1, wherein the catalyst composition is present in an amount corresponding to 0.01 mol percent of $MeR_n$, based on propylene oxide.

5. A process for preparing a propylene oxide copolymer which comprises copolymerizing propylene oxide with a 1,2-epoxide of the formula

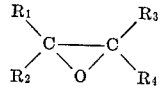

wherein $R_1$, $R_2$, $R_3$ and $R_4$ are independently selected from the group consisting of hydrogen, alkyl, vinyl, aryl, chloromethyl, bromomethyl, fluoromethyl, trifluoromethyl, halo, allyloxymethyl and phenoxymethyl groups, and wherein $R_2$ and $R_3$ may form a ring at a temperature of 0–200° C. in the presence of a catalyst composition consisting of an organometallic compound of the formula $MeR_n$, wherein Me is zinc or aluminum, R represents a hydrocarbon residue and $n$ is 2 when Me is zinc and 3 when Me is aluminum and a member selected from the group consisting of carbonates and sulfates of zinc, magnesium, calcium, strontium and barium, the weight ratio of the propylene oxide to the 1,2-epoxide being 99–5:1–95, and the molar ratio of said $MeR_n$ to said carbonates or sulfates being 0.01:2.0.

6. A process as claimed in claim 5, wherein the temperature is between room temperature and 130° C.

7. A process as claimed in claim 5, wherein R is ethyl or phenyl.

8. A process as claimed in claim 5, wherein the catalyst composition is present in an amount corresponding to 0.01 mol percent of $MeR_n$, based on the total molar amount of propylene oxide and 1,2-epoxide.

9. A catalyst composition consisting of an organometallic compound of the formula $MeR_n$, wherein Me is zinc or aluminum, R is a hydrocarbon residue and $n$ is 2 when Me is zinc and 3 when Me is aluminum, and at least one carbonate or sulfate of zinc, magnesium, calcium, strontium or barium.

10. The catalyst composition as claimed in claim 9, wherein said $MeR_n$ and said at least one carbonate or sulfate are present in a molar ratio of 0.01:2.0.

References Cited

UNITED STATES PATENTS

| | | | |
|---|---|---|---|
| 2,870,100 | 1/1959 | Stewart et al. | 260—2 |
| 2,917,470 | 12/1959 | Bressler et al. | 260—2 |
| 3,128,256 | 4/1964 | Bailey et al. | 260—2 |

FOREIGN PATENTS

| | | |
|---|---|---|
| 818,737 | 8/1959 | Great Britain. |

WILLIAM H. SHORT, *Primary Examiner.*

T. E. PERTILLA, *Assistant Examiner.*